(12) United States Patent
Holmdahl et al.

(10) Patent No.: US 7,389,754 B2
(45) Date of Patent: Jun. 24, 2008

(54) SYSTEM FOR A TWO-STROKE CRANKCASE SCAVENGED COMBUSTION ENGINE

(75) Inventors: Mikael Holmdahl, Jönköping (SE); Håkan Granath, Taberg (SE)

(73) Assignee: Husqvarna AB, Huskvarna (SE)

( * ) Notice: Subject to any disclaimer, the term of this patent is extended or adjusted under 35 U.S.C. 154(b) by 0 days.

(21) Appl. No.: 11/570,190

(22) PCT Filed: Oct. 14, 2004

(86) PCT No.: PCT/SE2004/001502

§ 371 (c)(1),
(2), (4) Date: Feb. 16, 2007

(87) PCT Pub. No.: WO2005/124120

PCT Pub. Date: Dec. 29, 2005

(65) Prior Publication Data

US 2007/0169724 A1    Jul. 26, 2007

(30) Foreign Application Priority Data

Jun. 15, 2004   (SE) .................... PCT/SE04/00935

(51) Int. Cl.
*F02B 41/00* (2006.01)
*F02B 33/04* (2006.01)
*F02B 23/00* (2006.01)

(52) U.S. Cl. .............. 123/26; 123/73 PP; 123/586; 123/73 A; 261/23.2

(58) Field of Classification Search .......... 123/73 PP, 123/73 A, 586, 26, 73 C; 261/23.2
See application file for complete search history.

(56) References Cited

U.S. PATENT DOCUMENTS

| 4,966,104 | A | * | 10/1990 | Hundleby | ............ 123/65 BA |
| 6,328,288 | B1 | | 12/2001 | Gerhardy | |
| 6,708,958 | B1 | | 3/2004 | Warfel et al. | |
| 2003/0213464 | A1 | | 11/2003 | Geyer et al. | |
| 2007/0181084 | A1 | * | 8/2007 | Holmdahl | ................ 123/26 |

FOREIGN PATENT DOCUMENTS

| DE | 20119880 U1 | * | 4/2002 |
| EP | 0997621 A1 | | 5/2000 |
| EP | 1041267 A2 | | 10/2000 |
| WO | 2004005692 A1 | | 1/2004 |

* cited by examiner

*Primary Examiner*—Stephen K. Cronin
*Assistant Examiner*—Hyder Ali
(74) *Attorney, Agent, or Firm*—Pearne & Gordon LLP

(57) ABSTRACT

The present invention relates to a system (1) for supplying an air-fuel mixture to a two-stroke internal combustion engine cylinder (2), comprising a carburettor (3) having a throttle valve (4) and usually a choke valve. The system further has a transfer passage (6) between a crankcase chamber and a combustion chamber of said engine. A supply conduit for additional air (8) is having an air valve (10) for said additional air, and said supply conduit for additional air (8) is being adapted to discharge the additional air into the top portion of said transfer passage (6) during a portion of a cycle of said two-stroke internal combustion engine. Further the air valve (10) is controlled by the throttle valve (4) so as to affecting a air valve opening state when said throttle valve opening state is affected. Said air valve (10) is of a barrel valve type while said throttle valve (4) is of a butterfly valve type.

18 Claims, 4 Drawing Sheets

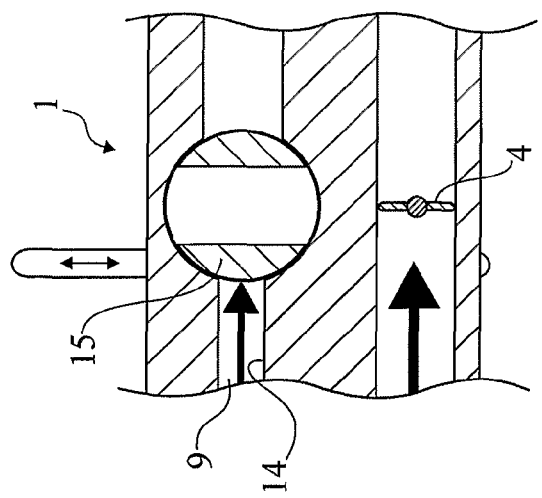
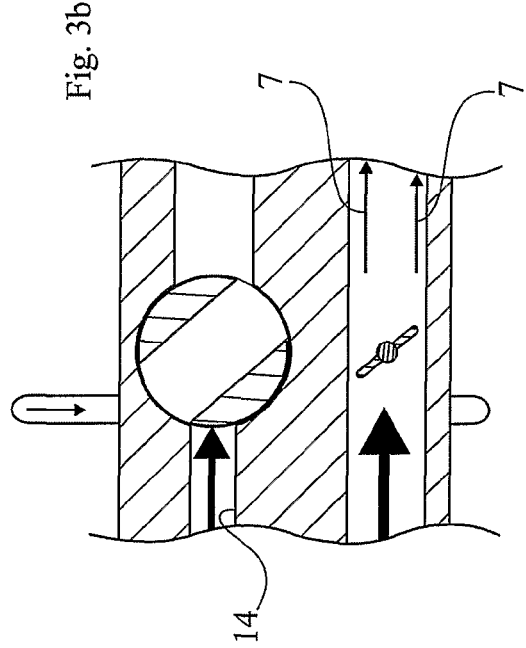
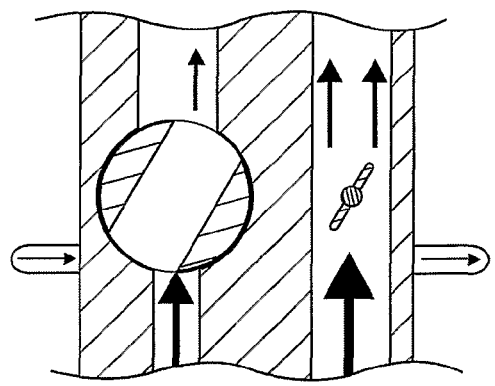
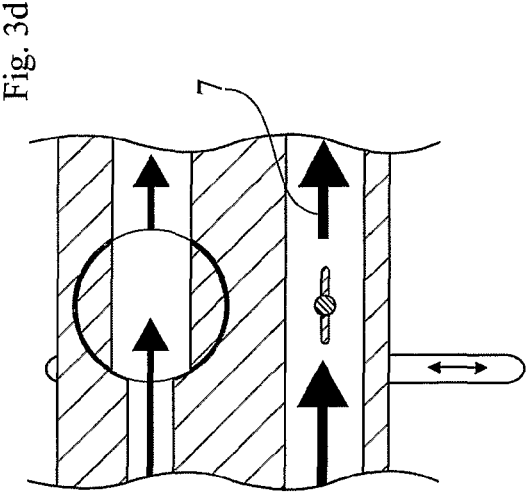

SYSTEM FOR A TWO-STROKE CRANKCASE SCAVENGED COMBUSTION ENGINE

TECHNICAL FIELD

The present invention relates to a system for a two-stroke crankcase scavenged internal combustion engine, in which an air passage for additional air is arranged between an air inlet and the upper part of a transfer duct. Fresh air is added at the top of the transfer duct and is intended to serve as a buffer against the air/fuel mixture below. This buffer is mainly lost out into the exhaust outlet during the scavenging process. The fuel consumption and the exhaust emissions is thereby reduced.

BACKGROUND OF THE INVENTION

For conventional two-stroke combustion engines it is well known how to control the air/fuel mixture, but a high level of unburned hydrocarbon emissions is produced because in this engine the scavenging process is performed exclusively by a mixture of air and fuel. Some of the air/fuel mixture mixes with the exhaust gases and thereby some unburned fuel is lost out with the exhaust gases.

Two-stroke combustion engines using the additional air technique during the scavenging are previously known in the art. These engines reduce fuel consumption and exhaust emissions. But for these prior art engines it is a problem to control the air/fuel mix during normal operation and during start. One common start procedure for a conventional two-stroke engine is with a closed choke valve and a fully open throttle valve. In combination with a "conventional" additional air technique this will provide too much air for optimal starting conditions. Since these kind of engines are used in many different environments and subjected to troublesome conditions it is desired to achieve a reliable design with a robust operation. One issue with engines using the additional air technique is to also provide good start properties. The operational conditions for this kind of engines can be of varying temperature, humidity, atmospheric pressure etc. The manufacturer Walbro has launched a carburettor comprising a double barrel valve with one part for the mixture and one part for the additional air. This however is a rather complicated design and much more expensive than a conventional carburettor. U.S. Pat. No. 6,328,288 shows a system comprising two butterfly valves. An elongated slot is arranged in the throttle valve lever for fastening the link to the air valve lever to give a delayed opening of the air valve. This arrangement of a link is not very satisfactory as there is an increased risk that the link will fall apart. Further there is a risk of ice build-up in the slot in the winter. This will make starting very difficult.

Hence, there is a need for an improved system for a two-stroke engine using the additional air technique to achieve good properties for start and normal operation. Further it is an advantage to combine proper operation of such an engine with lean and environmentally friendly operation. Finally it would be advantageous to provide a robust, cost effective and high-quality system for this kind of engine.

SUMMARY OF THE INVENTION

The object of the present invention is to provide a system for supplying an air/fuel mixture to a two-stroke internal combustion engine that overcomes at least some of the above-mentioned matters and present an improved control of the air/fuel mixture to the engine.

According to the invention there is provided a system for supplying an air-fuel mixture to a two-stroke crankcase scavenged internal combustion engine, comprising a carburettor having a throttle valve.

The system further has a transfer passage between a crankcase chamber and a combustion chamber of the engine, and a supply conduit for additional air having an air valve for said additional air. The supply conduit for additional air being adapted to discharge the additional air into the top portion of said transfer passage, either directly through a check valve or via a recess in an engine piston, during a portion of a cycle of said two-stroke internal combustion engine. The air valve is controlled by said throttle valve so as to affecting a air valve opening state when said throttle valve opening state is affected, and in that said air valve is of a barrel type while said throttle valve is of a butterfly valve type.

In prior art two-stroke engines with additional air there is a problem with too much additional air through the supply conduit when the choke valve in the carburettor is closed. The present invention provides an improved solution for two-stroke engines using additional air. With this solution it is possible to control the air/fuel mixture during start-up, normal operation and other conditions for the engine.

Advantageously the air valve is resiliently connected to said throttle valve so as to affecting a air valve opening state when the throttle valve opening state is affected and the choke valve in a choked state is adapted to delimit the opening state of said air valve regardless of the throttle valve opening state. This resiliently connection between the air valve and the throttle valve can be performed in different ways, for example by levers connected by a spring, spring loaded rod with flexible length, telescopic rod, oval holes in combination with springs or levers with interacting teeth. In an alternative design of the system a control device for controlling the supply of additional air due to the choke opening state can be provided adjacent to the air valve, with influence from the choke valve.

BRIEF DESCRIPTION OF THE DRAWINGS

By way of example, embodiments of the present invention will now be described with reference to the accompanying drawing figures in which:

FIG. 3a-3d show in a schematic series how a throttle valve and an air valve of the invention works together.

DETAILED DESCRIPTION OF PREFERRED EMBODIMENTS

A first embodiment of the present invention will be described in more detail in the following, with reference to the accompanying drawings.

Figure 1:
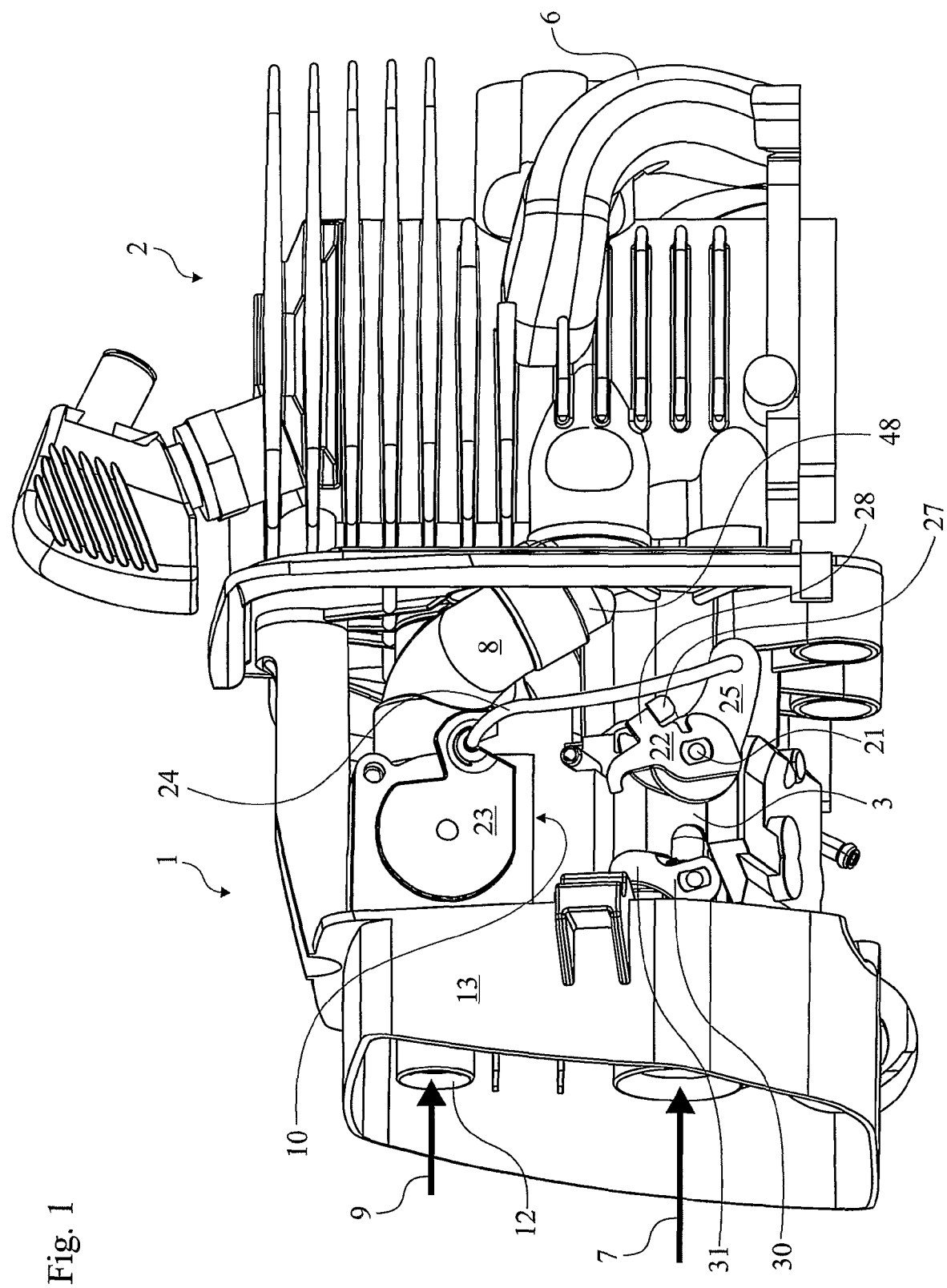
FIG. 1 is a perspective side-view showing a two-stroke engine cylinder provided with a system for supplying air-fuel mixture and for supplying additional air during the scavenging process.
Figure 2:
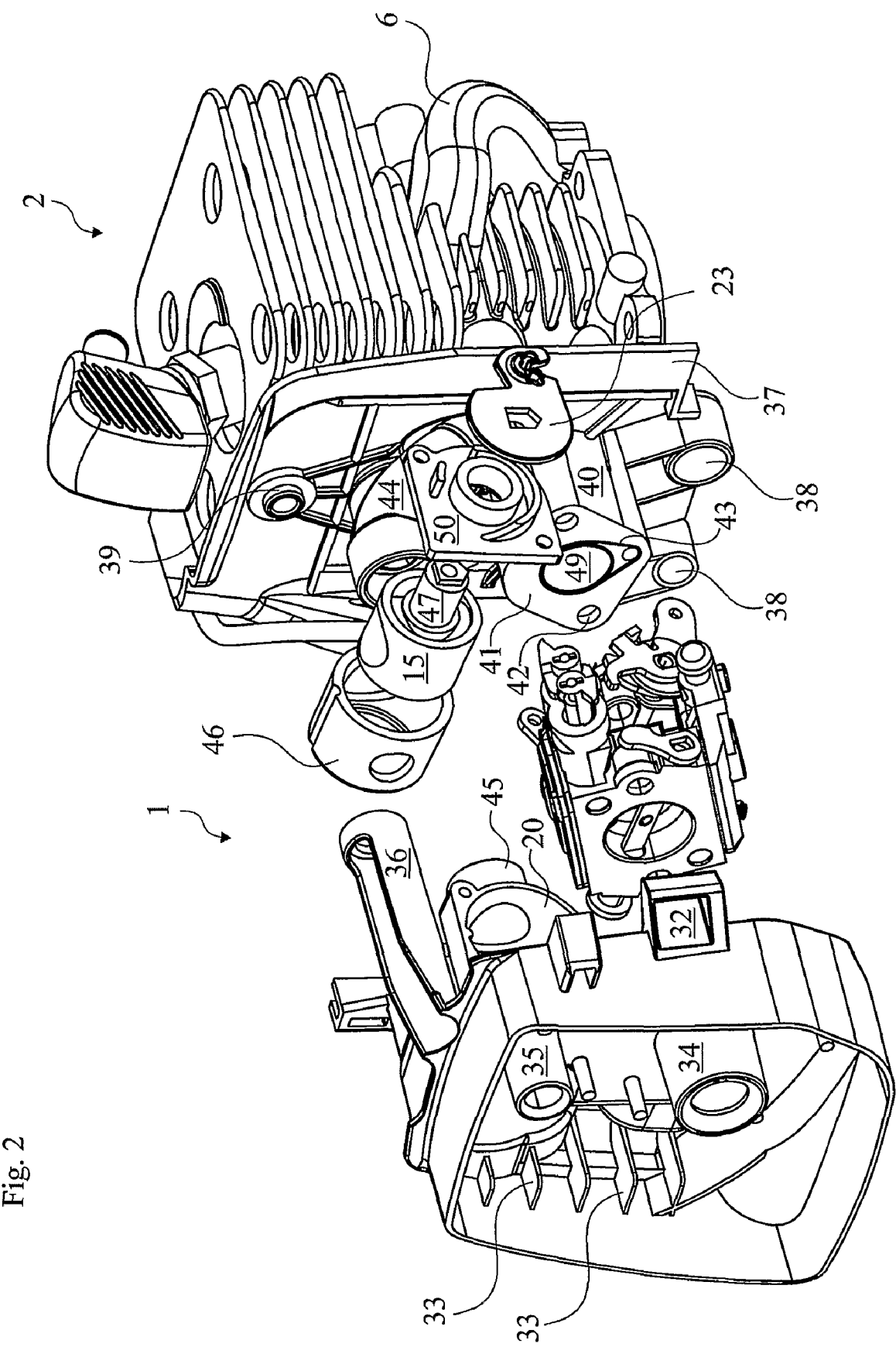
FIG. 2 shows the same system but with the main parts drawn away from each other for clarity reasons.

Referring to FIGS. 1 and 2, a two-stroke engine cylinder 2 with carburettor 3 and a system for additional air 9 is shown. The carburettor 3 is provided at an intake of the cylinder. Further is the piston provided for letting air/fuel mix into the crankcase and fresh air, for the scavenging process, into the upper part of a transfer passage 6 during a portion of an engine cycle. During a stage of the engine cycle the air/fuel mixture is compressed in the crankcase and thereafter the exhaust gases is pressed out through the exhaust port by the compressed air/fuel mixture. The buffer of fresh air in the transfer passage 6, provided from the additional air system, enter the combustion chamber before the air/fuel mixture. Consequently the risk for uncombusted fuel to accompany the exhaust gases out from the combustion chamber is reduced. The additional air 9 is provided into the transfer passage 6 through a channel 8 and an aperture in the cylinder 24. Which aperture, during a portion of the engine cycle, leads into a recess in the piston fluidly connected to the transfer passage 6. The channel 8 for additional air could also connect directly to a transfer passage 6 via a check valve or so called Reed valve. The flow of additional air 9 into the transfer passage 6 is substantially simultaneous with the flow of air/fuel mixture into the crankcase.

The additional air channel 8 is provided with an air valve 10 for controlling the additional air to the engine 2. The air valve 10 for additional air is interconnected with the throttle valve 4 of the carburettor 3, this is to give synchronous control of the opening state of the throttle and the supply of additional air via the air valve 10.

In more detail this is arranged as shown in FIGS. 1 and 2. To the left there is a filter housing 13 shown without a lid and a filter element. It has two ducts, an upper duct for supplying additional air 9, and a lower duct for supplying air to the carburettor 7. As seen in FIG. 2 the filter housing 13 has an air intake 32, which supplies air at the bottom of the filter housing. From the bottom of the housing rise a number of ridges 33 and an upper tube 35 and a lower tube 34. The filter element rests on top of the ridges 33 but is provided with holes for the upper and lower tube. Therefore air from the air intake 32 will go from the bottom through the filter element and will from there be sucked into the intake for additional air and the intake for air to the carburettor. The additional air 9 flows to an air valve 10 that is of a barrel valve type. Said air valve comprises an air valve housing 20 which forms an integrated part of the filter housing 13. This is a cost effective design which also prevents leaks between a separate valve and the filter housing 13.

A shielding baffle 37 is fastened to the cylinder and crankcase by a number of screws fastened through the apertures 38, 39. The two lower apertures 38 are made for screws to be fastened in the crankcase, not shown. The upper aperture 49 holds a nose 36 on the filter housing 13. The screw is fastened through an aperture in the nose 36 and into the aperture 39 (secured in the cylinder). The shielding baffle 37 shields the fuel system from a strong heat from the engine cylinder 2. It further has a protruding part 40, which ends in a fastening plane 41. The plane has two fastening holes 42 and a sealing 43 that seals between the plane 41 and the carburettor 3. When mounting the system a carburettor 3 is located correctly on the fastening pane 41 and the filter housing 13 is placed on the carburettor and two screws are secured through the filter housing. The holes that are not visible run through holes 48 in the carburettor and are secured in holes 42 in the shielding baffle 37. In the protruding part 40 there is a duct 49 that leads the mixture from the carburettor into the intake port of the cylinder. The shielding baffle further has two short ducts 48, as can be seen in FIG. 1. The branched rubber fitting 44 is fitted to the two tubes 48 in the shielding baffle and to the outlet part 45 of air valve 10. As shown in figure the air valve 10 holds a number of parts. First the sleeve 46 is inserted in the opening of the air valve and then the barrel cylinder 15 is inserted inside the sleeve. The barrel cylinder 15 has a shaft 47. An end plate 50 is placed over the shaft and screwed to the air valve. The end plate 50 is arranged to house a spring that is attached to the air valve lever 23 that is attached to the shaft 47 and therefore rotates the barrel 15 and opens and closes the valve.

FIG. 3a-3b schematically show how this system works, i.e. how the throttle valve 4 and the air valve 10 work together. In FIG. 3a both the throttle valve and the air valve 10 are fully closed. You can see that the throttle valve 4 and the rotatable barrel 15 both are in fully closed positions. As explained earlier, the two valves are interconnected by a rod or link 24. In this series of figures this interconnection is indicated by a movable rod 51 to the left of the two valves. In FIG. 3b both the throttle valve 4 and the barrel 15 have been rotated by rotating the throttle valve itself. The position in this figure shows an open throttle valve 4 and a closed barrel valve 10, but just about to be opened. In the next FIG. 3c the two valves have been rotated a bit further and are both approximately half open. Therefore the additional air 9 can pass the barrel valve in FIG. 3c, while this was not possible in the two earlier FIGS. 3a, 3b. In FIG. 3d both valves are fully opened, i.e. they have both been rotated approximately 90 degrees. Therefore they don't throttle the flow of additional air 9 or air flow through the carburettor 7. As explained in connection to FIG. 1 the supply conduit 8 for additional air 9 has a first end 12 in a filter housing 13 and a second end in an additional air port in a cylinder wall. However, between the two ends there is a fixed flow restriction 14, as evident in FIGS. 3 and 4. The fixed flow restriction is located between the first end 12 and the rotatable barrel 15 in the barrel valve 10. As evident in FIGS. 3 and 4 the fixed restriction 14 covers a part of the length of a first conduit part 17 between the first end 12 and the rotatable barrel 15, and ends at the rotatable barrel restricting an intake opening 18 to the barrel. This fixed restriction therefore starts at the rotatable barrel and covers a part of the length towards the first end 12. In FIG. 4 it covers the whole length, but this not necessary.

The fixed restriction has a number of advantages. First it throttles the additional air flow 9 even when the rotatable barrel 15 is fully opened as shown in FIGS. 3d and 4c. This throttling reduces the amount of additional air at high engine speeds, which results in an improved air-fuel mixture ratio. Without such a fixed restriction the air-fuel mixture will be too lean in these speeds. Further this restriction influences the angle which the rotatable barrel 15 can be rotated before opening. This angle can be seen by comparing FIGS. 3b and 3a as well as by comparing FIGS. 4b and 4a. This is of course provided that the fixed restriction meets the rotatable barrel, which is a preferred embodiment. If instead the first conduit part 17 would have had the same diameter as the second conduit part 5 the angle of rotation for opening the valve of the barrel 15 would be smaller. It is an advantage to have a relatively large angle for the barrel to rotate before it starts to open the air valve. When starting the engine it is important that the air valve is closed and a late opening of the air valve promotes acceleration of the engine.

The fixed restriction can also be located in the rotatable barrel itself. Preferably the restriction covers the full length of the aperture in the barrel. The restriction could also be located between a downstream end of the barrel itself restricting the outlet opening 19 from the barrel 15 and the downstream end of the barrel valve. It is preferable to have the restriction in this location so it affects the aperture through the air valve. Preferably the restriction has an area of more than 0,1× the area of the unrestricted conduit area and of less than 0,7× the unrestricted area and preferably of more than 0,2× the unrestricted conduit area, and of less than 0,5× the unrestricted conduit area. The length of the restriction is not of very big importance. Therefore it can be adjusted according to economy of manufacturing etc. The fixed restriction 14 could also be located further downstream in the supply conduit 8, e.g. in the apertures in the shielding baffle 37, or even in the ports of the engine cylinder. The fixed restriction could also be used if air valve is instead of a butterfly valve type though this is less preferable.

As evident by this discussion there is a distinct advantage in choosing an air valve 10 of a barrel valve type instead of a butterfly valve type. The barrel can be rotated a considerable angle before opening, while the butterfly valve starts to open immediately. By choosing a butterfly valve type for the throttle valve and a barrel valve type for the air valve it is therefore possible to have preferable characteristics concerning opening of the two valves. And further, the angle of rotation of the barrel before opening can easily be adjusted by changing the size of the inlet or outlet or even the size of the aperture of the barrel valve itself, as shown above. This combination further has the advantage that a standard carburettor can be used, and further it is possible to use a rod or link attached to the air valve lever and to the other lever without having an elongated slot in either lever. This gives a more reliable control system.

Figure 4A:
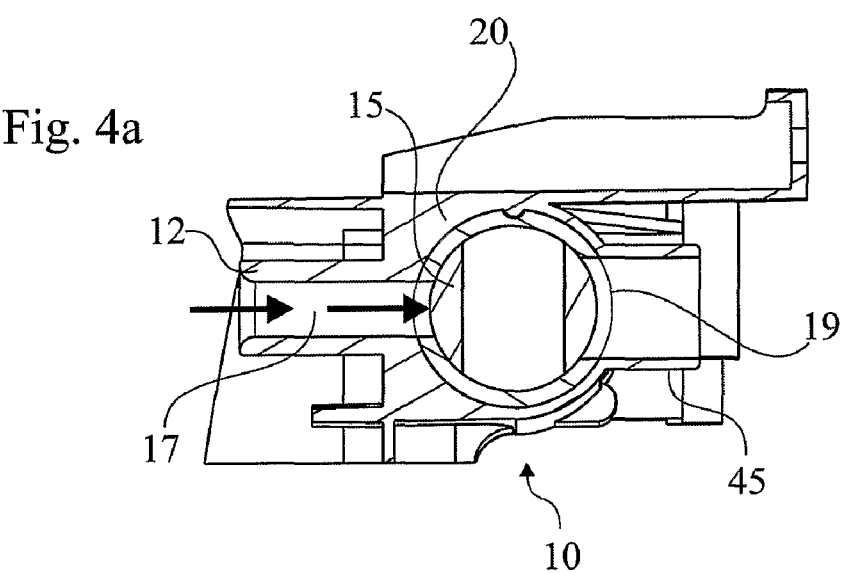
FIG. 4a-4c is a side-view of the air valve with its barrel in three different positions.
Figure 4B:
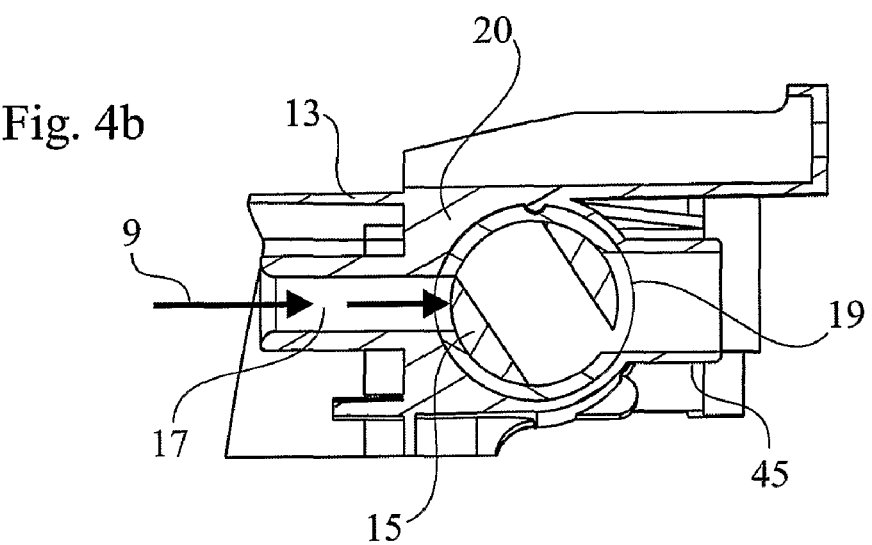
Figure 4C:
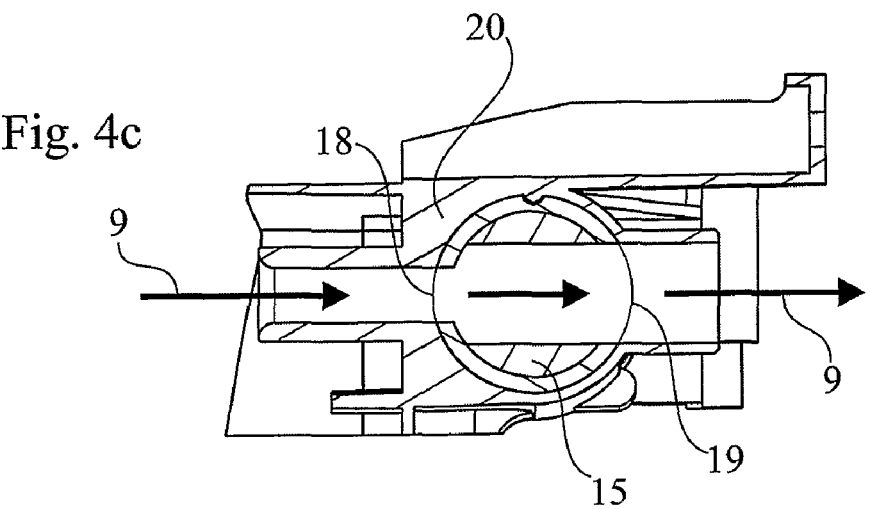

FIG. 4a-4c show the air valve 10 of barrel valve type and how the air valve housing 20 forms an integrated part of the filter housing 13, as described before.

As shown in FIGS. 1 and 2 the carburettor 3 can also be provided with a choke valve 29. In FIG. 2 a shaft for the choke valve is visible but not the valve plate itself that should be fastened to the shaft. This is for clarity reasons. It is preferable to provide the carburettor with a choke valve 29 upstream of the throttle valve and provided with a choke valve lever 30. This lever 30 is also provided with a cam 31 for interaction with the spring actuated lever 25 when choke valve 29 is moved from an open state. Hereby the cam 31 locks the spring-actuated lever 25 so that it cannot rotate and open the air valve 10 through rotating the air valve lever 23 via the rod 24. Instead when the throttle valve is actuated, this only tensions a spiral spring 26 attached between the throttle valve lever 22 and the spring actuated lever 25. So, the throttle valve lever 22 is interconnected with the air valve lever 23 via a spring and the spring-actuated lever 25 is moving the air valve lever via the rod 24. This arrangement makes it possible to start with a full choke setting combined with many different throttle settings up to full throttle without opening the air valve. For many kind of handheld tools, e.g. trimmers, it is a common and preferred way to start the tool using full choke combined with full throttle. In many other tools, e.g. chain saws, it is however more common to start the tool using full choke and only a limited degree of throttle. For such a tool it is not necessary to use a spring actuated lever 25 rotated by a spring 26. Instead it is possible to use only a throttle valve lever 22 that directly holds a rod 24 that turns the air valve lever 23.

When using a system that enables full throttle/full choke start, e.g. a system having a spring actuated lever 25, it is preferable that a spiral spring 26 is attached to said throttle valve lever, and acting on the spring actuated lever 25, pushing a first stop 27 on the spring actuated lever against a second stop 28 on the throttle valve lever 22. Hereby the spiral spring 26 is pre-tensioned which gives a more accurate work of the spring-actuated lever maneuvering the air valve lever. The system is especially preferable for handheld working tools provided with a two-stroke crankcase scavenged internal combustion engine.

The invention claimed is:

1. A system (1) for supplying an air-fuel mixture to a cylinder (2) of a two-stroke crankcase scavenged internal combustion engine, comprising a carburettor (3) having a throttle valve (4) and feeding an air-fuel mixture to an intake port of the cylinder, said system further has a transfer passage (6) between a crankcase chamber and a combustion chamber of the engine, and a supply conduit (8) for additional air (9) having an air valve (10) for the additional air, and said supply conduit for additional air (9) being adapted to discharge the additional air into the top portion of the transfer passage (6), either directly through a check-valve or via a recess in an engine piston, during a portion of a cycle of said two-stroke internal combustion engine, characterised in that said air valve (10) is controlled by said throttle valve (4) so as to affecting an air valve opening state when said throttle valve opening state is affected, and in that said air valve (10) is of a barrel valve type while said throttle valve (4) is of a butterfly valve type (4), wherein a shaft (21) of said throttle valve is provided with a throttle valve lever (22), which lever is interconnected with an air valve lever (23) via a spring and a spring actuated lever (25) moving the air valve lever via a rod (24).

2. A system (1) according to claim 1, wherein in said supply conduit (8) for additional air (9) has a first end (12) in a filter housing (13) and a second end in an additional air port in a cylinder wall, and between the two ends there is a fixed flow restriction (14).

3. A system (1) according to claim 2, wherein said fixed flow restriction (14) is located between the first end (12) and a rotatable barrel (15) in the barrel valve (10).

4. A system (1) according to claim 3, wherein said fixed restriction (14) covers a part of the length of a first conduit part (17) between the first end (12) and the rotatable barrel (15), and ends at the rotatable barrel restricting an intake opening (18) to the barrel (15).

5. A system (1) according to claim 1, wherein said air valve (10) comprises an air valve housing (20), which forms an integrated part of the filter housing (13).

6. A system (1) according to claim 1, wherein the spring is a spiral spring (26) attached to said throttle valve lever and acting on the spring actuated lever (25) pushing a first stop (27) on the spring actuated lever against a second stop (28) on the throttle valve lever (22).

7. A system (1) according to claim 1, wherein the carburettor (3) is provided with a choke valve (29) upstream of the throttle valve and provided with a choke valve lever (30).

8. A system (1) according to any one of the claims 1 and 6-7, wherein at least one of said spring actuated lever (25) and said choke lever (30) is provided with a cam (31) for interaction, when said choke valve (29) is moved from an open state.

9. A two-stroke internal combustion engine provided with a system (1) for supplying an air-fuel mixture according to claim 1.

10. A hand-held working tool provided with a two-stroke internal combustion engine having a system (1) for supplying an air-fuel mixture according to claim 1.

11. A system (1) for supplying an air-fuel mixture to a cylinder (2) of a two-stroke crankcase scavenged internal combustion engine, comprising a carburettor (3) having a throttle valve (4) and feeding an air-fuel mixture to an intake port of the cylinder, said system further has a transfer passage (6) between a crankcase chamber and a combustion chamber of the engine, and a supply conduit (8) for additional air (9) having an air valve (10) for the additional air, and said supply conduit for additional air (9) being adapted to discharge the additional air into the top portion of the transfer passage (6), either directly through a check-valve or via a recess in an engine piston, during a portion of a cycle of said two-stroke internal combustion engine, characterised in that the supply conduit (8) comprises three parts; a first conduit part (17) leading from a first end (12) in a filter housing (13) and to a rotatable barrel (15) in the rotatable barrel valve (10), the rotatable barrel forming a barrel conduit part being followed by a downstream conduit part leading to a second end in an additional port in a cylinder wall and there is a fixed flow restriction (14) in at least one but not in all the three conduit parts, and said air valve (10) is controlled by said throttle valve (4) so as to affecting an air valve opening state when said throttle valve opening state is affected, and in that said air valve (10) is of a barrel valve type while said throttle valve (4) is of a butterfly valve type (4).

12. A system (1) according to claim 11, wherein said fixed flow restriction (14) is located between the first end (12) and a rotatable barrel (15) in the barrel valve (10).

13. A system (1) according to claim 12, wherein said fixed restriction (14) covers a part of the length of a first conduit part (17) between the first end (12) and the rotatable barrel (15), and ends at the rotatable barrel restricting an intake opening (18) to the barrel (15).

14. A system (1) according to claim 11, wherein the fixed restriction (14) is located in the rotatable barrel and preferably covers its full length.

15. A system (1) according to claim 11, wherein said air valve (10) comprises an air valve housing (20), which forms an integrated part of the filter housing (13).

16. A system (1) according to claim 11, wherein a shaft (21) of said throttle valve is provided with a throttle valve lever (22), which lever is connected directly with an air valve lever (23), provided on a shaft of said air valve, via a rod (24).

17. A two-stroke internal combustion engine provided with a system (1) for supplying an air-fuel mixture according to claim 11.

18. A hand-held working tool provided with a two-stroke internal combustion engine having a system (1) for supplying an air-fuel mixture according to claim 11.

* * * * *